(12) United States Patent
Yeum

(10) Patent No.: US 9,987,750 B2
(45) Date of Patent: Jun. 5, 2018

(54) ROTATING DEVICE FOR VEHICLE PART TEST DEVICE

(71) Applicant: HYUNDAI MOTOR COMPANY, Seoul (KR)

(72) Inventor: Jung Whan Yeum, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 248 days.

(21) Appl. No.: 14/944,007

(22) Filed: Nov. 17, 2015

(65) Prior Publication Data

US 2017/0080573 A1    Mar. 23, 2017

(30) Foreign Application Priority Data

Sep. 18, 2015  (KR) .................. 10-2015-0132541

(51) Int. Cl.
*G01M 17/00* (2006.01)
*B25J 9/16* (2006.01)
*B25J 19/02* (2006.01)
*B25J 11/00* (2006.01)
*B25J 17/02* (2006.01)

(52) U.S. Cl.
CPC ............ *B25J 9/1697* (2013.01); *B25J 11/00* (2013.01); *B25J 17/0283* (2013.01); *B25J 19/022* (2013.01); *Y10S 901/09* (2013.01); *Y10S 901/47* (2013.01)

(58) Field of Classification Search
USPC ............................. 73/114.77, 116.01, 117.01
See application file for complete search history.

(56) References Cited

U.S. PATENT DOCUMENTS

| 2007/0173977 | A1 | 7/2007 | Schena |
| 2010/0103431 | A1 | 4/2010 | Demopoulos |
| 2013/0338434 | A1 | 12/2013 | Schena |

FOREIGN PATENT DOCUMENTS

| JP | 2011-115897 A | 6/2011 |
| JP | 2012-210439 A | 11/2012 |
| JP | 5442457 B2 | 3/2014 |
| KR | 10-0868882 B1 | 11/2008 |
| KR | 10-2011-0107953 A | 10/2011 |
| KR | 10-1190310 B1 | 10/2012 |
| KR | 10-16322710 B1 | 10/2013 |

OTHER PUBLICATIONS

Korean Office Action dated Nov. 30, 2016, issued in Korean Application No. 10-2015-0132541.

*Primary Examiner* — Eric S McCall
(74) *Attorney, Agent, or Firm* — McDermott Will & Emery LLP

(57) ABSTRACT

A vehicle part test device includes a first operating portion rotatably mounted to a robot for testing a vehicle part; a second operating portion rotatably mounted to the first operating portion; and a third operating portion rotatably mounted to the second operating portion and having a test portion which tests the vehicle part.

13 Claims, 10 Drawing Sheets

ROTATING DEVICE FOR VEHICLE PART TEST DEVICE

CROSS-REFERENCE TO RELATED APPLICATION

This application is based on and claims the benefit of priority to Korean Patent Application No. 10-2015-0132541, filed on Sep. 18, 2015 in the Korean Intellectual Property Office, the disclosure of which is incorporated herein in its entirety by reference.

TECHNICAL FIELD

The present disclosure relates to a vehicle part test device, and more particularly, to a vehicle part test device capable of increasing mobility and a test region by rotating the vehicle part test device connected to a robot when changing a test position of a vehicle part.

BACKGROUND

In general, vehicle parts are tested in a vehicle part process line. Recently, the part test has been performed through a robot in order to improve workability and reliability. Here, the part test should be performed in each position of the parts.

For example, in a case of a vehicle door, a front side, a rear side, an upper end portion, and the like, of a door panel are tested. In this case, a position of the robot should be changed depending on a part test position.

The robot includes a part test device in order to test the vehicle parts. However, in the related art, the entire robot should be driven at the time of changing the part test position. Therefore, mobility is low and a test position is not subdivided, such that work reliability is decreased.

SUMMARY

The present disclosure has been made to solve the above-mentioned problems occurring in the prior art while advantages achieved by the prior art are maintained intact.

An aspect of the present inventive concept provides a vehicle part test device capable of increasing mobility and a test region by rotating a test device connected to a robot at the time of changing a test position of a vehicle part.

According to an exemplary embodiment, a vehicle part test device includes a first operating portion rotatably mounted to a robot for testing a vehicle part; a second operating portion rotatably mounted to the first operating portion; and a third operating portion rotatably mounted to the second operating portion and having a test portion which tests the vehicle part.

The first operating portion may include: a first motor having a coupling groove formed therein so that a portion of the robot is inserted thereinto and rotating the first operating portion; and a first frame mounted to the first motor to rotate integrally with the first motor.

The first operating portion may be rotatable in both directions around a virtual vertical axis.

The second operating portion may include: second motors mounted at both ends of the first frame to rotate the second operating portion; and a second frame connected to the second motors to thereby be rotatable.

The second operating portion may further include connection gears connected to the second motors and connecting the first frame and the second frame to each other to allow the second frame to be rotatable from the first frame.

The second operating portion may be rotatable in both directions around a virtual horizontal axis.

The third operating portion may include: third motors mounted at both ends of the second frame to rotate the third operating portion; and a third frame connected to the third motors to thereby be rotatable and having the test portion positioned at a portion adjacent to the vehicle part.

The third operating portion may further include connection gears connected to the third motors and connecting the second frame and the third frame to each other to allow the third frame to be rotatable from the second frame.

The third operating portion may be rotatable in both directions around a virtual vertical axis.

The test portion may include: a fourth motor mounted to the third frame to rotate the test portion; a laser irradiating light to sense a position of the vehicle part; and a camera photographing the light of the laser irradiated to the vehicle part to confirm the position of the vehicle part and to test the vehicle part.

The test portion may be connected to the first operating portion, the second operating portion, and the third operating portion to rotate each of the first operating portion, the second operating portion, and the third operating portion.

The test portion may further include a connection gear connected to the fourth motor and connecting the test portion and the third frame to each other to allow the test portion to be rotatable from the third frame.

According to another exemplary embodiment, a vehicle part test device includes: a first operating portion including a first motor rotatably mounted to a robot at the time of testing a vehicle part for a vehicle and a first frame rotating integrally with the first motor; a second operating portion rotatably mounted to the first operating portion and including second motors mounted at both ends of the first frame and a second frame connected to the second motors to thereby be rotatable; and a third operating portion rotatably mounted to the second operating portion and including third motors mounted at both ends of the second frame and a third frame connected to the third motors to thereby be rotatable and having a test portion positioned at a portion adjacent to the vehicle part to test the vehicle part. The test portion is connected to the first operating portion, the second operating portion, and the third operating portion to rotate each of the first operating portion, the second operating portion, and the third operating portion and includes: a fourth motor mounted to the third frame to rotate the test portion; a laser irradiating light to sense a position of the vehicle part; and a camera photographing the light of the laser irradiated to the vehicle part to confirm the position of the vehicle part and test the vehicle part.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
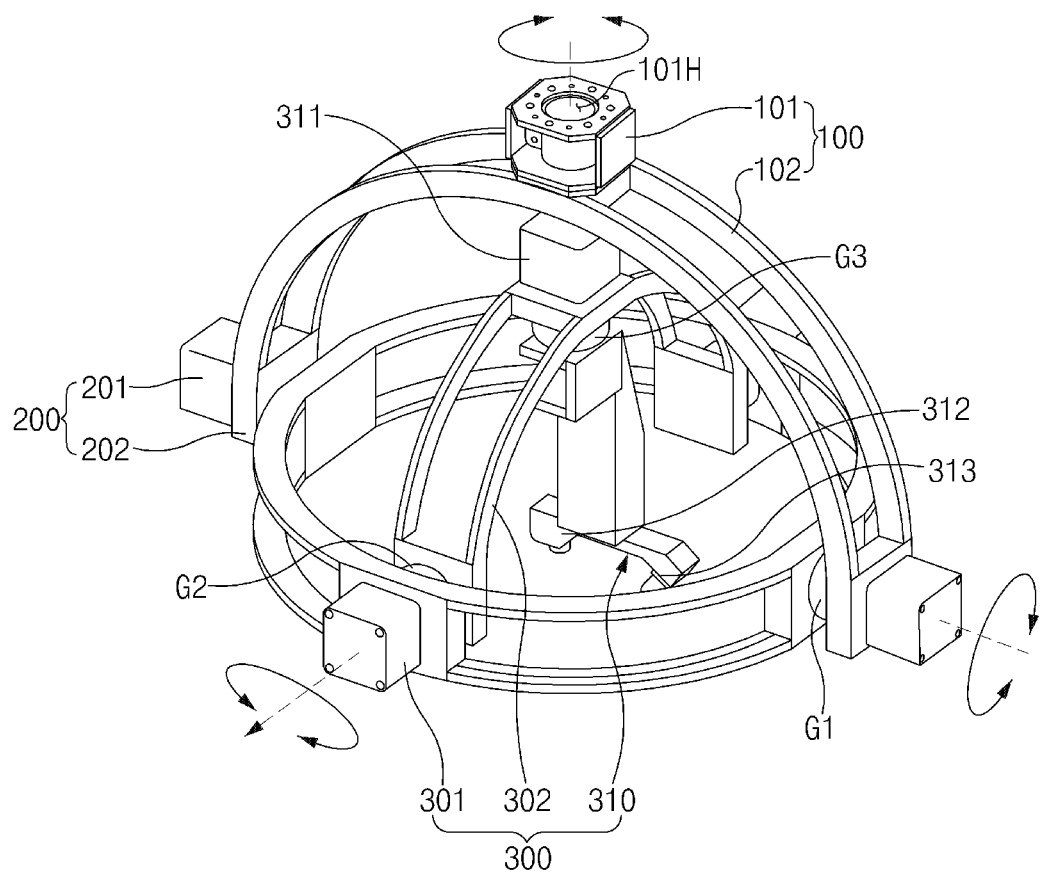
FIG. 1 is a view illustrating an example of a vehicle part test device according to an exemplary embodiment of the present inventive concept.

Exemplary embodiments of the present inventive concept will be described in detail with reference to the accompanying drawings.

Referring to FIGS. 1-8, a vehicle part test device according to the present disclosure includes a first operating portion 100 rotatably mounted to a robot 10, a second operating portion 200 rotatably mounted to the first operating portion 100, and a third operating portion 300 rotatably mounted to the second operating portion 200 having a test portion 310.

Figure 2:
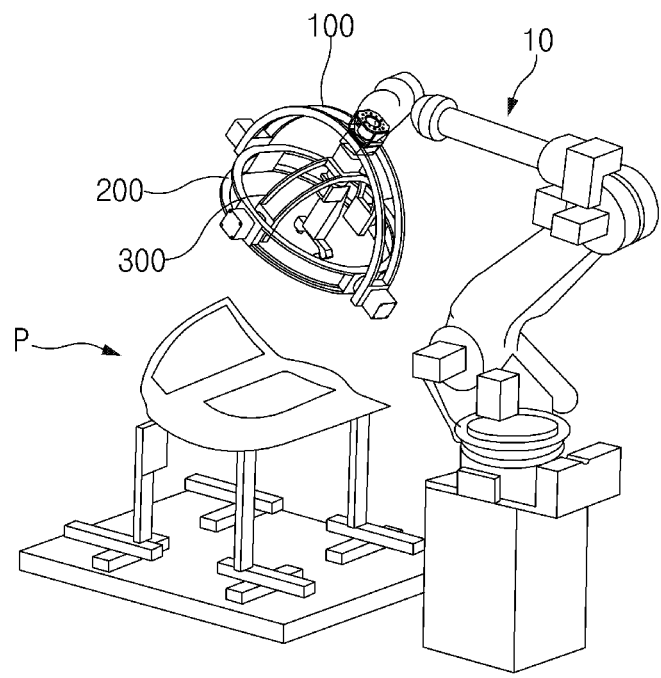
FIG. 2 is a view illustrating a vehicle part test device according to an exemplary embodiment of the present inventive concept.

As illustrated in FIGS. 1 and 2, the first operating portion 100 is rotatably mounted to the robot 10.

The first operating portion 100 is rotatably connected to the second and third operating portions 200 and 300 to enable rotation in several directions when testing a vehicle part P, thereby controlling movement to a test position of the part P.

In addition, the first operating portion 100 includes: a first motor 101 which enables rotation; and a first frame 102 which is connected to the first motor 101 to thereby rotate.

The first motor 101 has a coupling groove 101H formed therein to allow a portion of the robot 10 to be inserted thereinto and coupled thereto, and generates a torque.

The first frame 102 is mounted to the first motor 101 to rotate integrally with the first motor 101.

In addition, the first frame 102 may have a semicircular structure having a space formed therein to allow a second frame 202 to rotate in the first frame 102.

The first operating portion 100 is rotatable in both directions (clockwise direction and counterclockwise direction) around a virtual vertical axis.

The second operating portion 200 is rotatably mounted to the first operating portion 100.

In addition, the second operating portion 200 includes second motors 201 enabling rotation and the second frame 202 connected to the second motors 201 to thereby rotate.

The second motors 201 are mounted to outer sides of both ends of the first frame 102 to generate a torque, thereby enabling the rotation of the second operating portion 200.

The second frame 202 is connected to the second motors 201 to thereby rotate.

In addition, the second frame 202 may have a circular structure having a space formed therein to allow a third frame 302 to rotate in the second frame 202, and may rotate in the first frame 102.

An outer diameter of the second frame 202 is smaller than an inner diameter of the first frame 102, such that the second frame 202 may rotate in the first frame 102.

The second operating portion 200 is rotatable in both directions (clockwise direction and counterclockwise direction) around a virtual horizontal axis perpendicular to the above-mentioned virtual vertical axis.

The second operating portion 200 may have connection gears G1 connected to the second motors 201 and connecting the first frame 102 and the second frame 202 to each other to allow the second frame 202 to be rotatable from the first frame 102.

The third operating portion 300 is rotatably mounted to the second operating portion 200 and includes the test portion 310 to test the vehicle part P.

In addition, the third operating portion 300 includes: third motors 301 which enables rotation; and a third frame 302 which is connected to the third motors 301 to thereby rotate and has the test portion 310 mounted thereat.

The third motors 301 are mounted to outer sides of both ends of the second frame 202 to generate a torque, thereby enabling the rotation of the third operating portion 300.

The third frame 302 is connected to the third motors 301 to thereby rotate and includes the test portion 310 to test the vehicle part P.

In addition, the third frame 302 may have a semicircular structure having a space formed therein to thereby be provided with the test portion 310 that is to perform the test of the vehicle part P, and may rotate in the second frame 202.

An outer diameter of the third frame 302 is smaller than an inner diameter of the second frame 202, such that the third frame 302 may rotate in the second frame 202.

The third operating portion 300 is rotatable in both directions (clockwise direction and counterclockwise direction) around another virtual horizontal axis perpendicular to the above-mentioned virtual horizontal vertical axis.

The third operating portion 300 may include connection gears G2 connected to the third motors 301 and connecting the second frame 202 and the third frame 302 to each other to allow the third frame 302 to be rotatable from the second frame 202.

Figure 3:
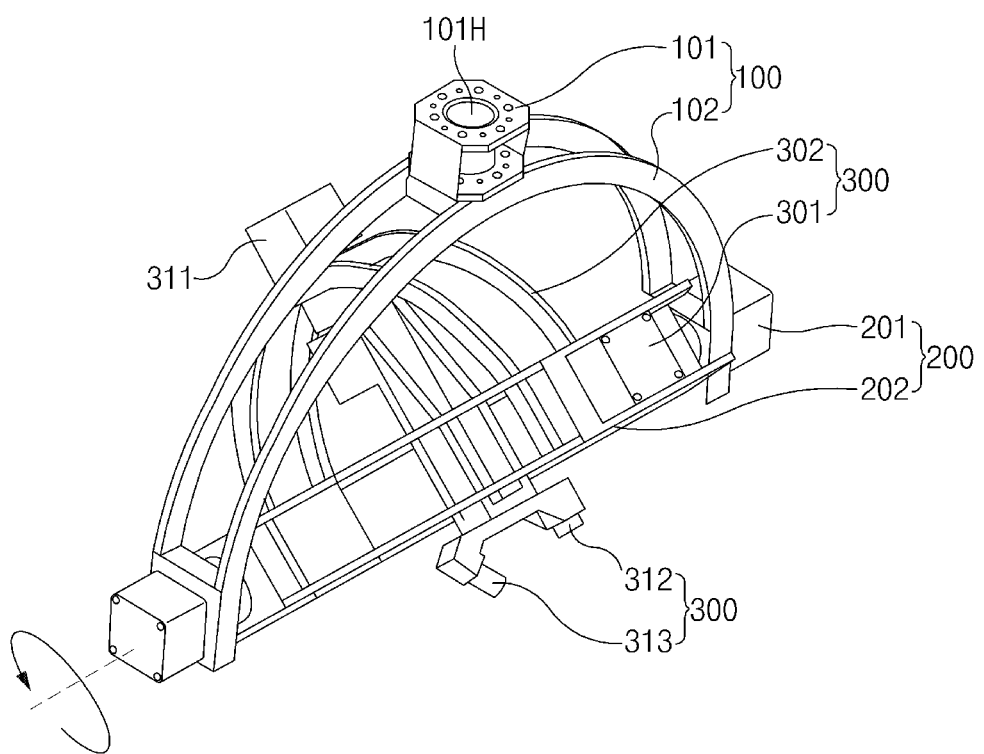
FIG. 3 is a view illustrating a state in which a third operating portion rotates in a counterclockwise direction in the vehicle part test device according to an exemplary embodiment of the present inventive concept.
Figure 4:
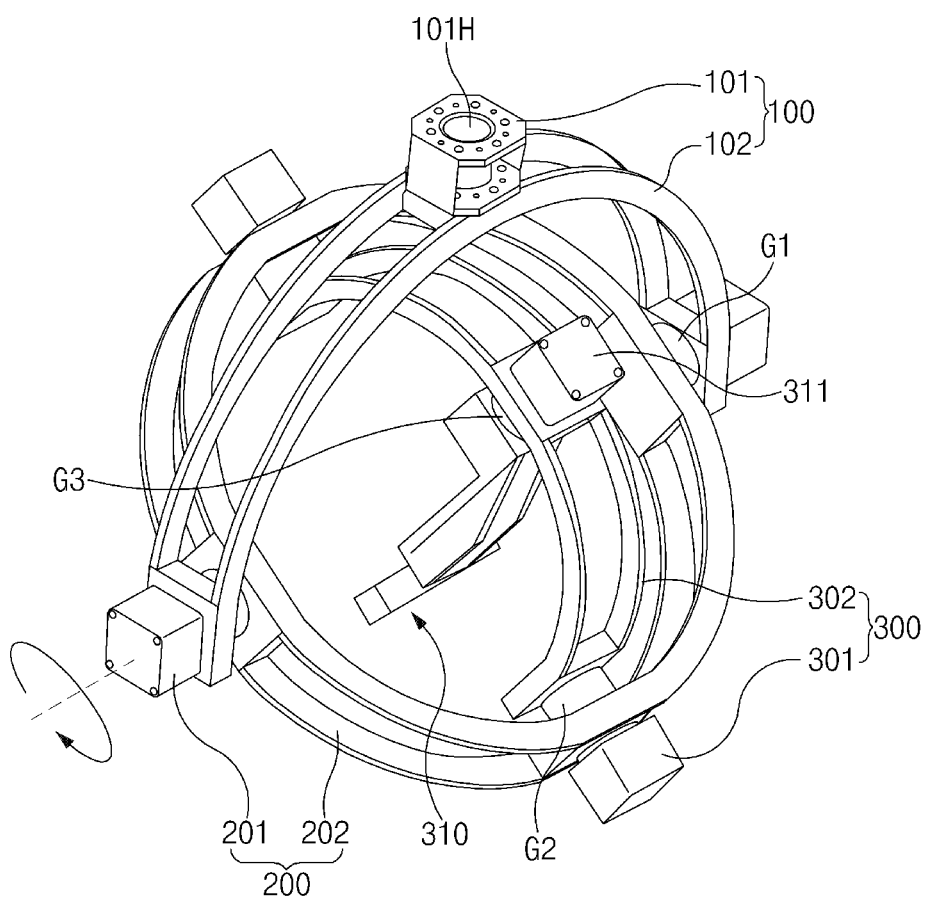
FIG. 4 is a view illustrating a state in which the third operating portion rotates in a clockwise direction in the vehicle part test device according to an exemplary embodiment of the present inventive concept.

That is, the third operating portion 300 may rotate in the counterclockwise direction, as illustrated in FIG. 3, or rotate in the clockwise direction, as illustrated in FIG. 4.

Figure 5:
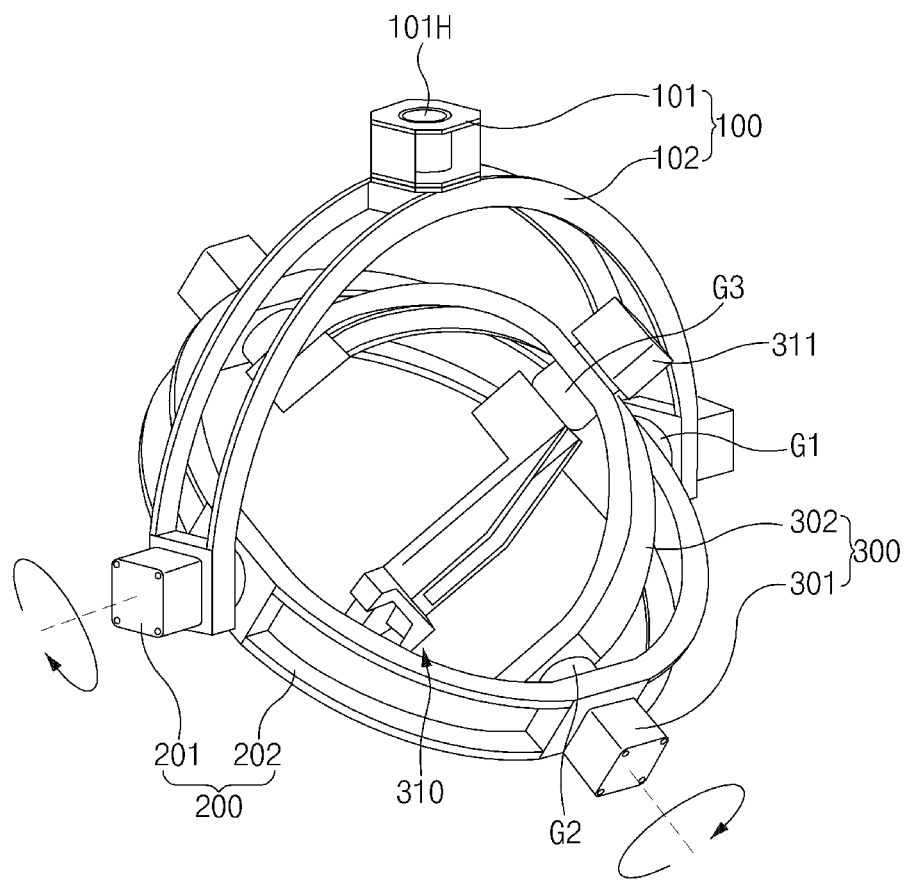
FIG. 5 is a view illustrating a state in which the third operating portion and a second operating portion rotate in the counterclockwise direction in the vehicle part test device according to an exemplary embodiment of the present inventive concept.
Figure 6:
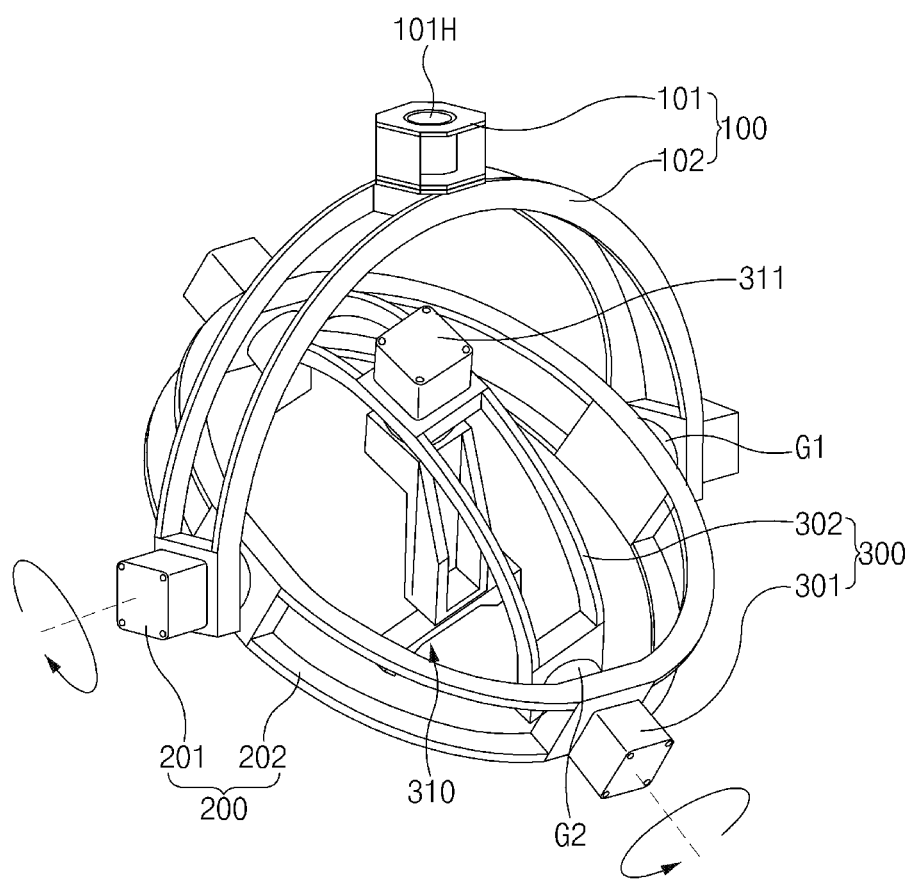
FIG. 6 is a view illustrating a state in which the third operating portion rotates in the clockwise direction and the second operating portion rotates in the counterclockwise direction in the vehicle part test device according to an exemplary embodiment of the present inventive concept.

In addition, the third operating portion 300 and the second operating portion 200 may rotate in the counterclockwise direction, as illustrated in FIG. 5, or the third operating portion 300 may rotate in the clockwise direction and the second operating portion 200 may rotate in the counterclockwise direction, as illustrated in FIG. 6.

Figure 7:
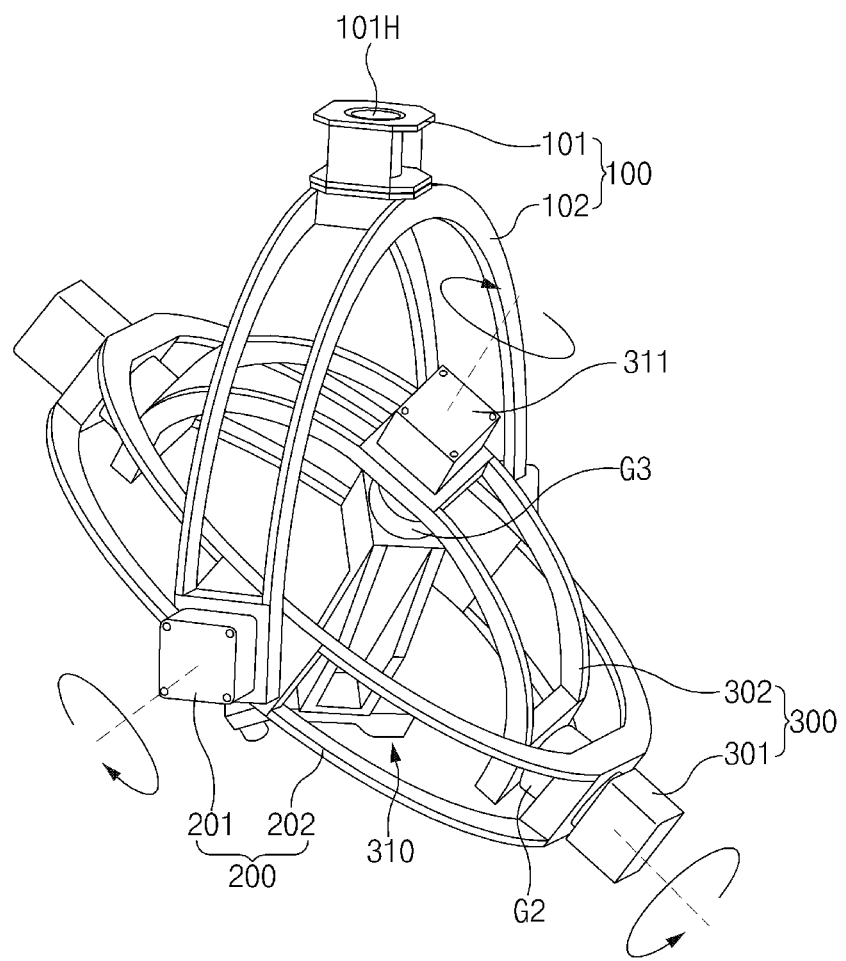
FIG. 7 is a view illustrating a state in which the third operating portion and a first operating portion rotate in the clockwise direction and the second operating portion rotates in the counterclockwise direction in the vehicle part test device according to an exemplary embodiment of the present inventive concept.
Figure 8:
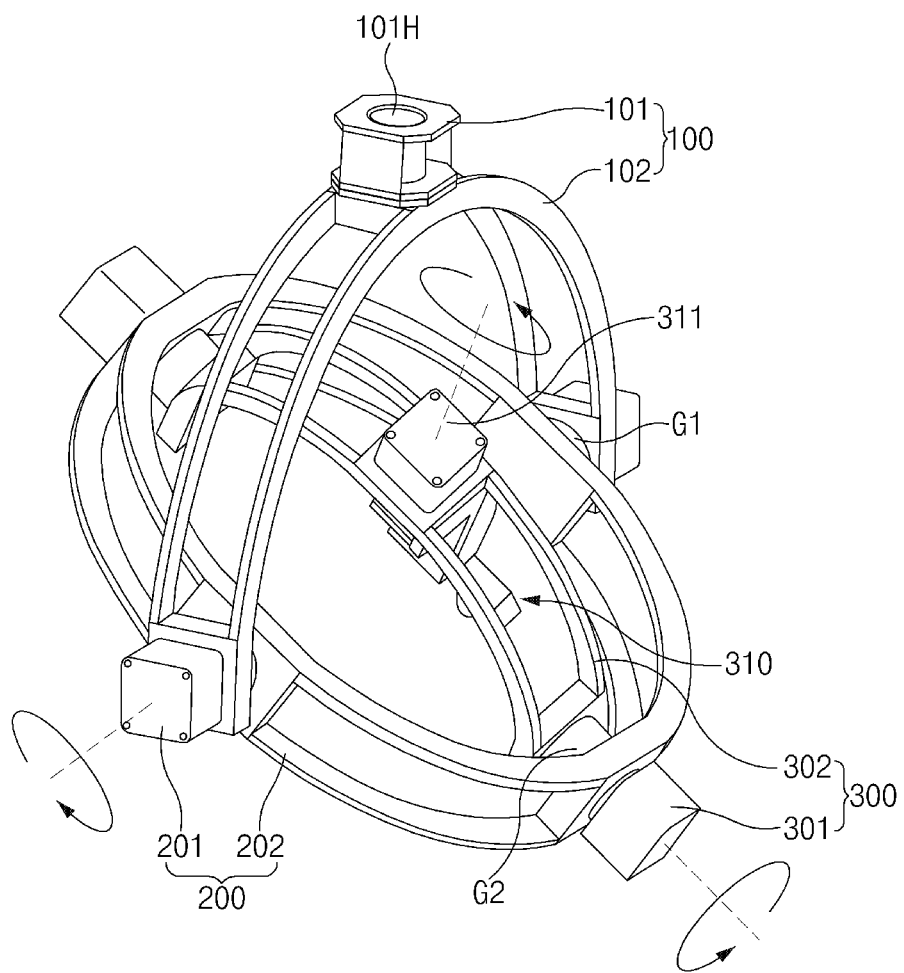
FIG. 8 is a view illustrating a state in which the third operating portion rotates in the clockwise direction and the first operating portion and the second operating portion rotate in the counterclockwise direction in the vehicle part test device according to an exemplary embodiment of the present inventive concept.

The third operating portion 300 and the first operating portion 100 may rotate in the clockwise direction and the second operating portion 200 may rotate in the counterclockwise direction, as illustrated in FIG. 7, or the third operating portion 300 may rotate in the clockwise direction and the first operating portion 100 and the second operating portion 200 may rotate in the counterclockwise direction, as illustrated in FIG. 8.

The test portion 310 included a fourth motor 311 for enabling rotation, a laser 312 sensing a position of the vehicle part P, and a camera 313 confirming the position of the vehicle part P and testing the vehicle part P.

The fourth motor 311 is mounted at the third frame 302 to rotate the test portion 310.

The laser 312 is formed at one end of a lower portion of the test portion 310 and irradiates light to allow the position of the vehicle part P to be sensed.

The camera 313 photographs light of the laser 312 irradiated to the vehicle part P to confirm the position of the vehicle part P and test the vehicle part P.

The test portion 310 is connected to the first operating portion 100, the second operating portion 200, and the third operating portion 300 to rotate each of the first operating portion 100, the second operating portion 200, and the third operating portion 300.

The test portion 310 may include a connection gear G3 connected to the fourth motor 311 and connecting the test portion 310 and the third frame 302 to each other to allow the test portion 310 to be rotatable from the third frame 302.

That is, when the vehicle part P is tested, the test portion 310 moves to an optimal position for testing the vehicle part P by driving the first operating portion 100, the second operating portion 200, and the third operating portion 300 while sensing and photographing the position of the vehicle part P through the laser 312 and the camera 313 provided in the test portion 310 after the vehicle part test device approaches the vehicle part P through the robot 10. Then, the test of the vehicle part P is completed.

Figure 9:
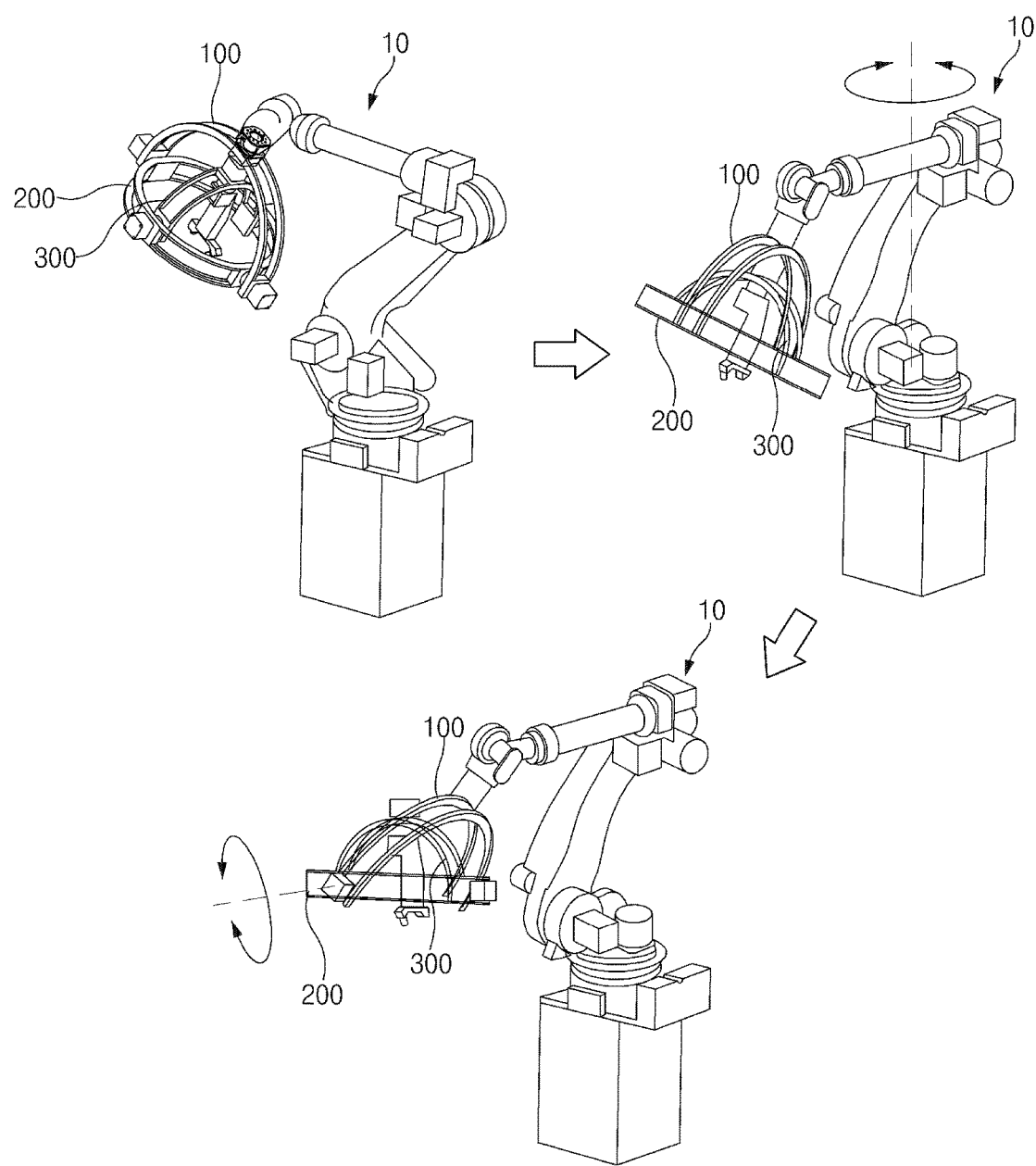
FIG. 9 is a view illustrating a state in which a robot and the vehicle part test device according to an exemplary embodiment of the present inventive concept are not synchronized with each other, such that a vehicle test is performed after the robot moves.
Figure 10:
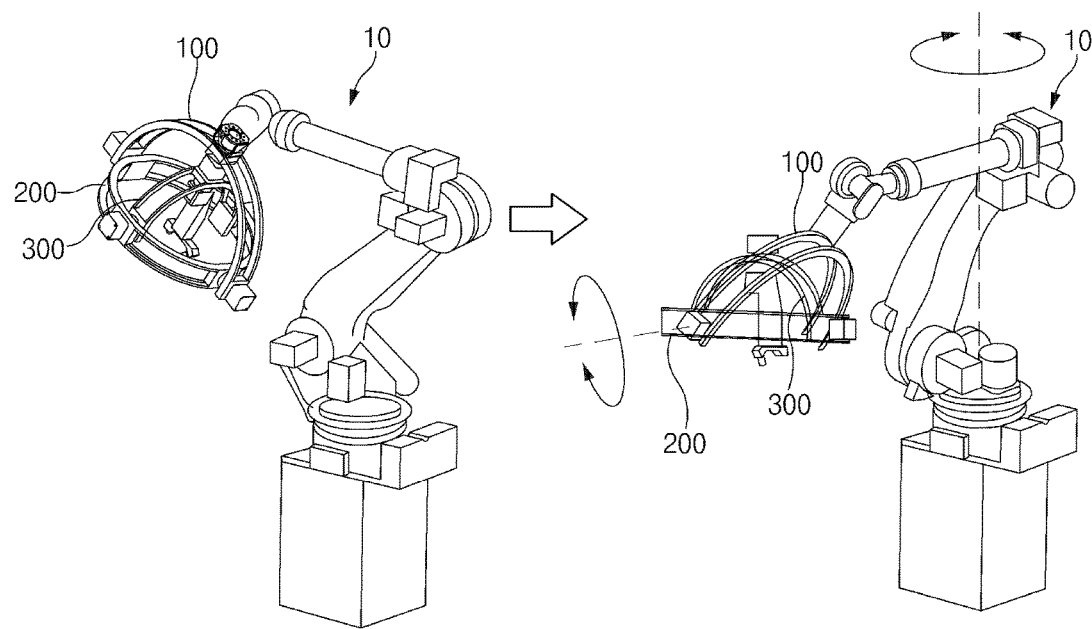
FIG. 10 is a view illustrating a state in which a robot and the vehicle part test device according to an exemplary embodiment of the present inventive concept are synchronized with each other, such that movement of the robot and a test are simultaneously performed.

In the present disclosure, as illustrated in FIG. 9, the robot 10 and the vehicle part test device are not synchronized with each other at the time of testing the vehicle part, such that the vehicle part test may be performed after the robot moves. Alternatively, as illustrated in FIG. 10, the robot 10 and the vehicle part test device are synchronized with each other, such that the movement of the robot 10 and the vehicle part test may be simultaneously performed.

As described above, the vehicle part test device according to the exemplary embodiment of the present inventive concept includes the first operating portion 100 including the first motor 101 rotatably mounted to the robot 10 at the time of testing the vehicle part P for a vehicle and the first frame 102 rotating integrally with the first motor 101. The second operating portion 200 is rotatably mounted to the first operating portion 200 and includes the second motors 201 mounted to both ends of the first frame 102 and the second frame 202 connected to the second motors 201 to thereby be rotatable. The third operating portion 300 is rotatably mounted to the second operating portion 200 and includes the third motors 301 mounted to both ends of the second frame 202 and the third frame 302 connected to the third motors 301 to thereby be rotatable and having the test portion 310 positioned at a portion adjacent to the vehicle part P to test the vehicle part P. The test portion 310 is connected to the first operating portion 100, the second operating portion 200, and the third operating portion 300 to rotate each of the first operating portion 100, the second operating portion 200, and the third operating portion 300 and includes the fourth motor 311 mounted to the third frame 302 to rotate the test portion 310. The laser 312 irradiates light to sense the position of the vehicle part P. The camera 313 photographs the light of the laser 312 irradiated to the vehicle part P to confirm the position of the vehicle part P and test the vehicle part P. Three operating portions are connected to the robot 10 for testing the vehicle part for a vehicle to rotate the test portion 310 in several directions even at the time of changing a test position of the vehicle part P, thereby enabling the test portion 310 to move to the test position of the vehicle part P. Therefore, mobility and a test region are increased, thereby making it possible to improve work convenience and work reliability.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:
1. A vehicle part test device comprising:
   a first operating portion having a semicircular structure with a space therein and rotatably mounted to a robot for testing a vehicle part;
   a second operating portion having a circular structure with a space therein and rotatably mounted to the first operating portion; and
   a third operating portion having a semicircular structure with a space therein and rotatably mounted to the second operating portion and having a test portion which tests the vehicle part.
2. The vehicle part test device according to claim 1, wherein the first operating portion includes:
   a first motor having a coupling groove formed therein so that a portion of the robot is inserted thereinto and rotating the first operating portion; and
   a first frame mounted to the first motor to rotate integrally with the first motor.
3. The vehicle part test device according to claim 2, wherein the first operating portion is rotatable in both directions around a virtual vertical axis.
4. The vehicle part test device according to claim 2, wherein the second operating portion includes:
   second motors mounted to both ends of the first frame to rotate the second operating portion; and
   a second frame connected to the second motors to thereby be rotatable.
5. The vehicle part test device according to claim 4, wherein the second operating portion further includes connection gears connected to the second motors and connecting the first frame and the second frame to each other to allow the second frame to be rotatable from the first frame.
6. The vehicle part test device according to claim 4, wherein the second operating portion is rotatable in both directions around a virtual horizontal axis.
7. The vehicle part test device according to claim 4, wherein the third operating portion includes:
   third motors mounted to both ends of the second frame to rotate the third operating portion; and
   a third frame connected to the third motors to thereby be rotatable and having the test portion positioned at a portion adjacent to the vehicle part.
8. The vehicle part test device according to claim 7, wherein the third operating portion further includes connection gears connected to the third motors and connecting the second frame and the third frame to each other to allow the third frame to be rotatable from the second frame.

9. The vehicle part test device according to claim 7, wherein the third operating portion is rotatable in both directions around a virtual vertical axis.

10. The vehicle part test device according to claim 7, wherein the test portion includes:
   a fourth motor mounted to the third frame to rotate the test portion;
   a laser irradiating light to sense a position of the vehicle part; and
   a camera photographing the light of the laser irradiated to the vehicle part to confirm the position of the part and test the part.

11. The vehicle part test device according to claim 10, wherein the test portion is connected to the first operating portion, the second operating portion, and the third operating portion to rotate each of the first operating portion, the second operating portion, and the third operating portion.

12. The vehicle part test device according to claim 10, wherein the test portion further includes a connection gear connected to the fourth motor and connecting the test portion and the third frame to each other to allow the test portion to be rotatable from the third frame.

13. A vehicle part test device comprising:
   a first operating portion having a semicircular structure with a space therein and including a first motor rotatably mounted to a robot for testing a vehicle part for a vehicle and a first frame rotating integrally with the first motor;
   a second operating portion having a circular structure with a space therein, rotatably mounted to the first operating portion, and including second motors mounted to both ends of the first frame and a second frame connected to the second motors to thereby be rotatable; and
   a third operating portion having a semicircular structure with a space therein, rotatably mounted to the second operating portion, and including: third motors which is mounted to both ends of the second frame; and a third frame which is connected to the third motors to thereby be rotatable and which has a test portion positioned at a portion adjacent to the vehicle part to test the part,
   wherein the test portion is connected to the first operating portion, the second operating portion, and the third operating portion to rotate each of the first operating portion, the second operating portion, and the third operating portion, and wherein the test portion includes: a fourth motor mounted to the third frame to rotate the test portion; a laser irradiating light to sense a position of the vehicle part; and a camera photographing the light of the laser irradiated to the vehicle part to confirm the position of the vehicle part and test the vehicle part.

* * * * *